US007526610B1

United States Patent
Emma et al.

(10) Patent No.: US 7,526,610 B1
(45) Date of Patent: Apr. 28, 2009

(54) SECTORED CACHE MEMORY

(75) Inventors: Philip G. Emma, Danbury, CT (US);
Robert K. Montoye, Jersey City, NJ (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/052,160

(22) Filed: Mar. 20, 2008

(51) Int. Cl.
*G06F 12/00* (2006.01)

(52) U.S. Cl. .......................................... 711/128; 711/3
(58) Field of Classification Search ................ 711/3, 711/128
See application file for complete search history.

(56) References Cited

U.S. PATENT DOCUMENTS

| 4,493,026 | A | * | 1/1985 | Olnowich | .................. | 711/128 |
|---|---|---|---|---|---|---|
| 5,291,442 | A | * | 3/1994 | Emma et al. | ................. | 711/120 |
| 6,212,602 | B1 | * | 4/2001 | Wicki et al. | ................. | 711/122 |
| 6,862,660 | B1 | | 3/2005 | Wilkins et al. | | |
| 2003/0014597 | A1 | * | 1/2003 | van de Waerdt | ............. | 711/136 |

* cited by examiner

*Primary Examiner*—Shane M Thomas
(74) *Attorney, Agent, or Firm*—Cantor Colburn LLP; Lisa Yamonaco

(57) ABSTRACT

A memory cache comprising, a data sector having a sector ID, wherein the data sector stores a data entry, a primary directory having a primary directory entry, wherein a position of the primary directory entry is defined by a congruence class value and a way value, and a secondary directory corresponding to the data sector having a secondary directory entry corresponding to the data sector, wherein the secondary directory entry include, a primary ID field corresponding to the way value, and a sector ID field operative to identify the sector ID.

2 Claims, 3 Drawing Sheets

US 7,526,610 B1

SECTORED CACHE MEMORY

CROSS-REFERENCE

The present application is co-pending with the concurrently filed application, entitled "METHODS INVOLVING MEMORY CACHES," assigned to the assignee of the present application, the contents of which are incorporated herein by reference in their entirety.

BACKGROUND OF THE INVENTION

1. Field of the Invention

This invention relates generally to a memory cache system for storing and retrieving data.

2. Description of Background

Data processing systems typically include a central processing unit (CPU) that executes instructions of a program stored in a main memory. To improve the memory response time, cache memories are used as high-speed buffers emulating the main memory. In general, a cache includes a directory to track stored memory addresses and a data array for storing data items present in the memory addresses. If a data item requested by the CPU is present in the cache, the requested data item is called a cache hit. If a data item requested by the CPU is not present in the cache requested data item is called a cache miss.

The cache is usually smaller than the main memory, thereby limiting the amount of data that may be stored in the cache. To exploit temporal and spatial locality of data references, caches often store a most recently referenced data item, and store contiguous (in address) blocks of data items, respectively. The contiguous block of data items is referred as a cache line, and is the unit of transfer from the main memory to the cache. The choice of the number of bytes in a cache line is one parameter in a cache design. In a fixed size cache, a small line size, exploits temporal locality, and allows more unique lines to be stored, but increases the size of the directory. A large line size exploits spatial locality, but increases the amount of time needed to transfer the line from main memory to cache (a cache miss penalty), and limits the number of unique lines that can be resident in the cache at the same time.

Cache sectoring reduces the cache miss penalty. In cache sectoring, cache lines are divided into "sectors," where the sector size is a function of a memory bus width. When a cache miss occurs, a cache line address is installed in a directory, but only the sector containing a referenced data item is transferred to a data array.

In sectored-caches, each directory entry maintains a "presence" bit per sector in the line. Presence bits are used to indicate which of the sectors in a line are present in the cache. Sectoring enables maintaining a small directory with a large line size without increasing the cache miss penalty. However, sectoring uses the data array inefficiently. For example, if a cache line is 32 bytes, and is made LIP of 4 byte sectors, there are 8 sectors in the cache line. If on average, only 3 out of the 8 sectors are referenced, 63% of the data array is "dead space,", which does not contain any useful data.

SUMMARY OF THE INVENTION

The shortcomings of the prior art are overcome and additional advantages are achieved through an exemplary memory cache comprising, a data sector having a sector ID, wherein the data sector stores a data entry, a primary directory having a primary directory entry, wherein a position of the primary directory entry is defined by a congruence class value and a way value, and a secondary directory corresponding to the data sector having a secondary directory entry corresponding to the data sector, wherein the secondary directory entry include, a primary ID field corresponding to the way value, and a sector ID field operative to identify the sector ID.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Systems involving caches for storing and accessing data are provided.

Figure 1:
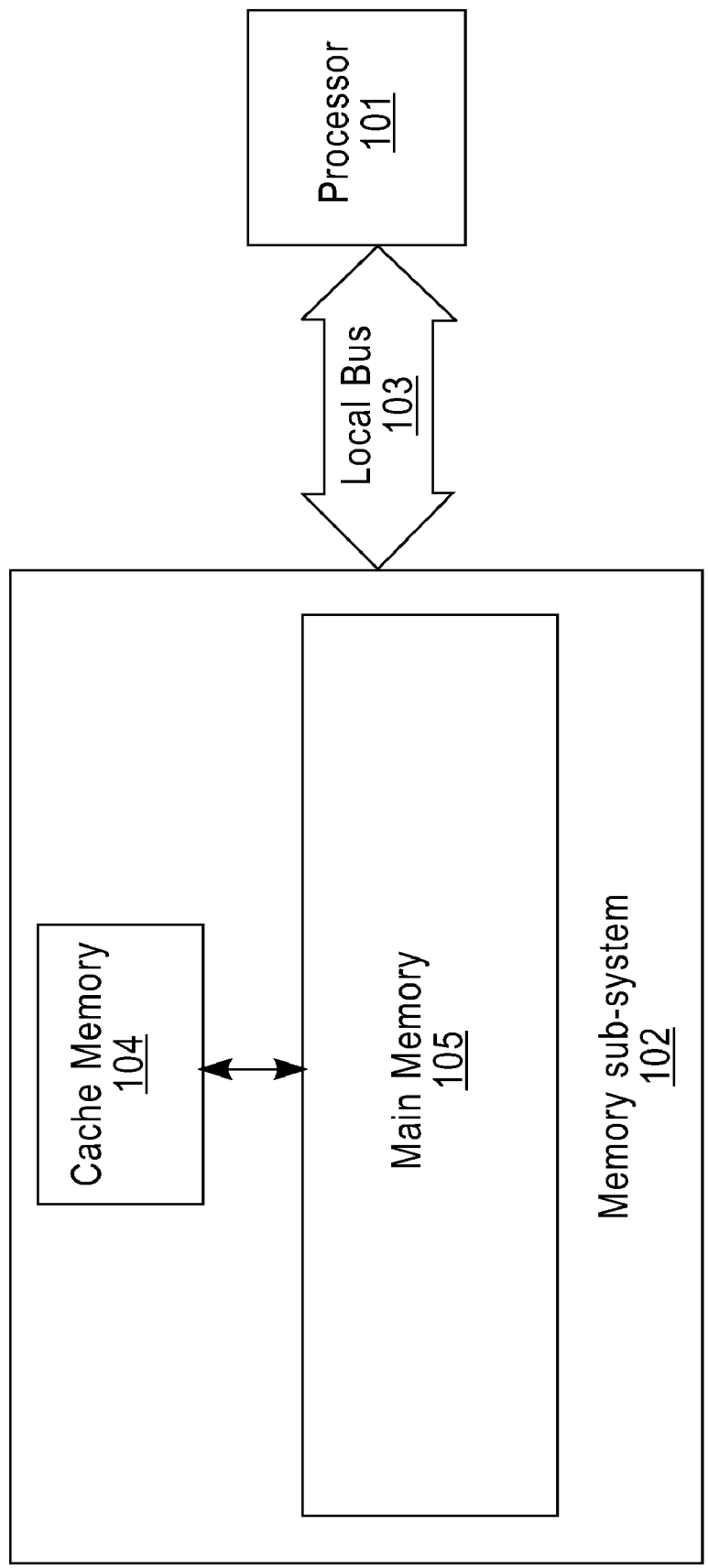
FIG. 1 illustrates an exemplary embodiment of a computer system.

In this regard, FIG. 1 illustrates a schematic representation of an exemplary embodiment of a computer system, including a processor 101 communicatively linked to a memory subsystem 102 via a local bus 103. The memory subsystem 102 includes a cache memory 104 and main memory 105. The cache memory 104 includes one or more levels of memory.

In operation the processor 101 requests data from the memory subsystem 102 via the local bus 103. The cache memory 104 is searched for a requested data item. If the requested data item is present in the cache memory 104, the data item is sent to the processor 101 via the local bus 103. If the data item is not present in the cache memory 104, the request is forwarded to the main memory 105, and the data is supplied to the processor 101. A copy of the data item is then stored in the cache memory 104.

Figure 2:
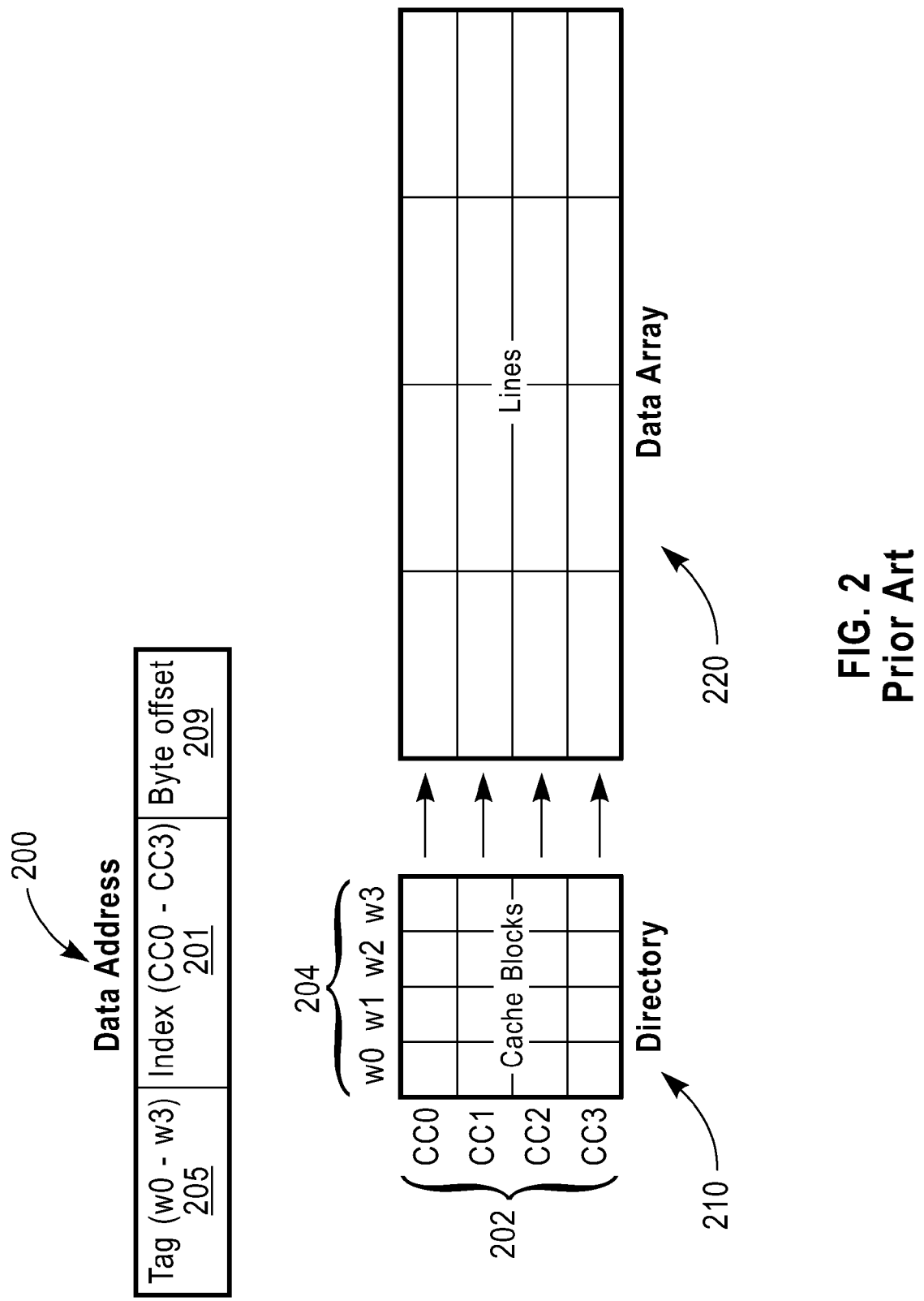
FIG. 2 illustrates a prior art example of a cache directory.

FIG. 2 illustrates an organization of a prior art example of a data address 200, a cache directory 210 comprising cache blocks, and a data array 220 comprising lines. The cache directory 210 is organized as a four-way set associative directory. The cache blocks are placed in rows and columns for efficient access of data items. In FIG. 2, there are four congruence classes (CC) 202 in rows, and four ways (w) 204 in columns.

The addresses mapping to one of the congruence classes 202 within the directory 210 may be stored in any of the four ways 204 within the congruence class 202. The directory 210 is associated with the data array 220. The cache blocks in the directory 210 have a 1:1 mapping with the lines in the data array 220.

FIG. 2 shows the data address 200 having fields used to map the addresses to the congruence class 202 and the way 204. Least significant bits of the address shown as "byte offset" 209, and are used to determine the datum accessed within a cache line. The high order bits shown as an "index" 201 following the byte offset 209, is the congruence class 202 identifier. The most significant bits shown as a "tag" 205, store the tag 205 used to compare with the tags in the four ways 204 within the congruence class 202.

In operation, a data address 200 includes fields holding a tag 205 that is compared with the tags held in the four ways 204, and an index 201 that represents a congruence class 202 value of CC0-CC3. Once the cache block in the directory 210 is found by referencing the data address 200, 1:1 mapping to the lines in the data array 220 directs the processor to the correct line having the addressed data in the data array 220.

The prior art example of FIG. 2 requires a relatively large data array 220 because the data array is organized on the basis of cache lines. When large line sizes are used to reduce the size of the directory, and exploit spatial locality, the size of the data array increases proportionately.

Figure 3:
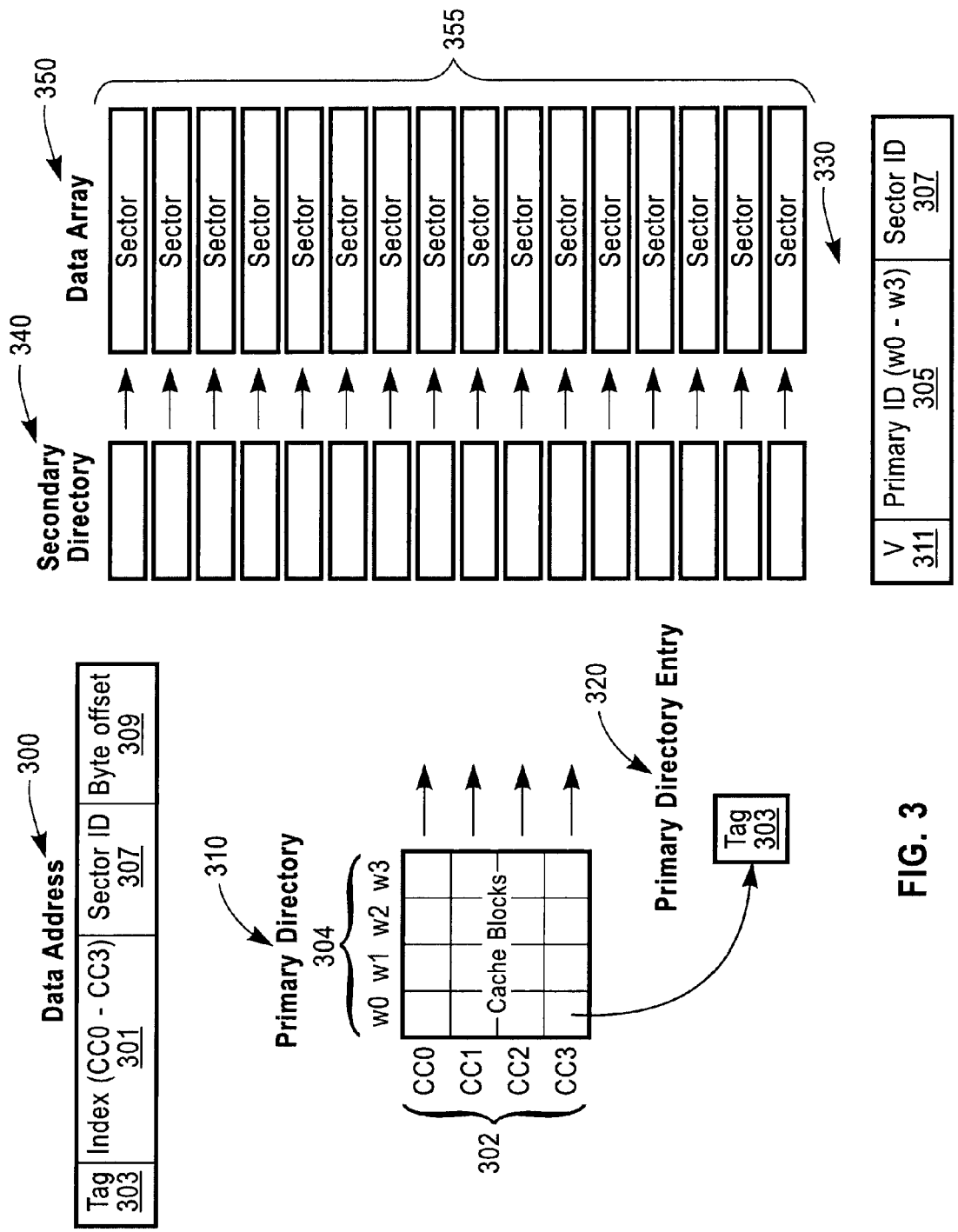
FIG. 3 illustrates an exemplary embodiment of a cache directory.

FIG. 3 illustrates an exemplary embodiment of a memory cache structure wherein a data array 350 is organized in sectors 355. The sectors 355 maintain a 1:1 correspondence with secondary directory entries 330 of a secondary directory 340. Each entry 330 in the secondary directory 340 has three fields: a valid bit field (V) 311, a primary ID 305, and a sector ID 307.

The memory cache structure also includes a primary directory 310. The primary directory 310 is organized similarly to the directory 210 shown in FIG. 2. The primary directory 310 is organized in rows that make up congruence classes (CC0-CC3) 302 and columns that make up ways (w0-w3) 304. Each cache block of the primary directory 310 holds a tag 303 as a primary directory entry 320. The number of directory entries in the primary directory 310 is equal to the number of lines having sectors 355 that may be stored at any time. The embodiment of FIG. 3 is a 4-way associative cache. Larger or smaller caches may be implemented in a similar structure.

FIG. 3 shows the data address 300 having fields used to map the address to the cache entry. Least significant bits of the data address 300 is a "byte offset" 309. The higher order bits following the byte offset 209 are a "sector ID" 307. The more significant bits shown represent an "index" 301. The "tag" 303 is the most significant bits stored in the data address 300.

In operation, assuming that the requested data is present in the cache, a desired data entry (not shown) stored in a sector 355 of the data array 350 will have a data address 300. Each primary directory entry 320 in the congruence class 302 holds a tag 303. The index 301 and the tag 303 in the data address 300 are used to determine the way 304 (column) that holds the tag 303 in the primary directory 310. The index 301 identifies the congruence class 302 (row) that holds the tag 303. Once the congruence class 302 is located, each of the primary directory entries 320 in the located congruence class 302 are compared to the tag 303 in the data address 300 to find the matching tag 303. When the matching tag 303 is found, the way 304 (column) that holds the matched tag 303 in the primary directory 310 is determined.

Once the way 304 is determined, the secondary directory 340 may be accessed. The way 304 corresponds to way values stored as the primary ID 305 in the secondary directory entries 330. The sector ID 307 in the data address 300 corresponds to the sector ID 307 in the secondary directory entry 330. The appropriate secondary directory entry 330 is found by searching the secondary directory 340 to match the determined way 304 and the sector ID 307 (from the data address 300) to the primary ID 305 and the sector ID 307 respectively of the secondary directory entries 330 stored in the secondary directory 340. Once the appropriate secondary directory entry 330 is found, the 1:1 correspondence of the secondary directory entry 330 to the sectors 355 in the data array 350 map the location of the sector 355 holding the requested data.

In operation, assuming that the requested data is not present in the cache, there are two possibilities. In the case when a matching tag 303 is present in the primary directory 310, the way 304 (column) that holds the matching tag 303, and the sector ID 307 in the data address 300 is installed in a secondary directory entry 330, and the data sector is installed in the corresponding location in the sectors 355 in the data array 350. In the case when a matching tag 303 is not present in the primary directory 310, the tag 303 is installed in the congruence class 302 identified by the index 301 of the data address 300. The way 304 (column) where the tag 303 is installed is then installed in a secondary directory entry 330 along with the sector ID 307 in the data address 300. The data sector is then installed in the corresponding location in the sectors 355 in the data array 350.

Valid bit field (V) 311 in the secondary directory entry 330 that indicates whether a data entry is valid may be included in the secondary directory entry. Additionally, the data address 300 may include the "byte offset" 309 that is used to determine the datum accessed within a cache sector.

If the average number of sectors 355 used within a line is x, and the number of address tags 303 held in the primary directory 310 is y, then the data array 350 is implemented to accommodate at least x times y sectors. The primary directory 310 has y entries and the secondary directory 340 has x times y entries. The value of x is workload (application) dependent, and is independent of y.

The following example describes the achieved reduction in area/size of the data array when implemented similarly to the embodiment illustrated in FIG. 3. In an 8-way associative cache with a line size of 1 Kilo Bytes (KB), and 64 byte sectors, there are a total of 16 sectors in each line. In a traditional set-associative cache organization known in prior art, the data array will have 8092 bytes (8 times 1 KB/line) per congruence class. If a sectored cache directory is used, additionally 16 "presence" bits are used per entry in the directory. If on the average, only 4 sectors are used per line, 6069 bytes of the data array either stores dead data (in the traditional set-associative cache), or is empty (in the traditional sectored set-associative cache). If the cache is organized similarly to the exemplary embodiment of FIG. 3, the data array, will have 4 sectors per line, and will have 2048 bytes (4 times 64 times 8) per congruence class. The primary directory will be similar to the directory of the traditional set-associative cache, but will not include the 16 "presence" bits per line as in a traditional sectored set-associative cache. Each entry of the secondary directory would include a valid bit (1 bit), the primary ID (3 bits), to identify one of the 8 ways it is associated with, and a sector ID (4 bits), to identify one of the 16 sectors within the line. There are a total of 32 entries in the secondary directory per congruence class with the total storage of 32 bytes. The cache organization reduces the area of the data arrays by a factor of 4 (from 8092 bytes to 2048 bytes), while requiring only 32 bytes of additional space for the secondary directory.

In another exemplary embodiment, a secondary directory may be organized as a traditional set-associative directory with congruence classes and sets. The alternate set-associative secondary directory may be indexed using a sector ID field of the address bits. Within the congruence class (index), an associative search of a primary ID may be used to determine a match.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A memory cache comprising:
   a data sector of a sectored cache line having a sector ID, wherein the data sector stores a data entry;
   a primary directory of a memory device having a primary directory entry, wherein a position of the primary directory entry is defined by a congruence class value and a way value; and
   a secondary directory of the memory device directly corresponding to the data sector having a secondary directory entry corresponding to the data sector, wherein the secondary directory entry consists only of:
   a primary ID field corresponding to the way value; and
   a sector ID field operative to identify the sector ID.

2. The memory cache of claim 1, wherein the primary directory entry is a tag.

* * * * *